(12) United States Patent
Scholz

(10) Patent No.: US 6,615,974 B2
(45) Date of Patent: Sep. 9, 2003

(54) FLEXIBLE CHAIN FOR USE IN A CONVEYOR SYSTEM

(75) Inventor: Richard Scholz, Lippetal-Nordwald (DE)

(73) Assignee: Beumer Maschinenfabrik GmbH & Co. KG, Beckum (DE)

( * ) Notice: Subject to any disclaimer, the term of this patent is extended or adjusted under 35 U.S.C. 154(b) by 0 days.

(21) Appl. No.: 10/090,558

(22) Filed: Mar. 4, 2002

(65) Prior Publication Data
US 2002/0130016 A1 Sep. 19, 2002

(30) Foreign Application Priority Data
Mar. 2, 2001 (EP) .............................................. 01105185

(51) Int. Cl.$^7$ .............................................. B65G 17/36
(52) U.S. Cl. ....................................... 198/712; 198/706
(58) Field of Search ................................ 198/712, 706, 198/701, 867.15; 474/213, 220

(56) References Cited

U.S. PATENT DOCUMENTS

| | | | | | |
|---|---|---|---|---|---|
| 505,296 | A | * | 9/1893 | Pollock | 198/712 |
| 1,422,151 | A | * | 7/1922 | Walker | 198/712 |
| 4,458,807 | A | * | 7/1984 | Teske | 198/731 |
| 4,501,351 | A | * | 2/1985 | Tracy | 198/648 |
| 4,518,077 | A | * | 5/1985 | Ronco et al. | 198/731 |
| 5,222,920 | A | * | 6/1993 | Cheesman et al. | 474/213 |
| 5,425,679 | A | * | 6/1995 | Utz | 474/231 |
| 5,626,220 | A | * | 5/1997 | Rieger et al. | 198/712 |
| 5,678,683 | A | * | 10/1997 | Stebnicki et al. | 198/853 |
| 5,730,280 | A | * | 3/1998 | Dalferth | 198/712 |
| 6,387,001 | B1 | * | 5/2002 | Markley | 474/223 |

FOREIGN PATENT DOCUMENTS

| | | |
|---|---|---|
| DE | 18 05 815 | 5/1970 |
| DE | 35 03 302 | 2/1988 |
| DE | 42 33 552 | 3/1994 |
| DE | 42 33 550 | 9/1995 |
| EP | 0 284 595 | 9/1988 |
| EP | 0 662 924 | 9/1993 |
| EP | 0 573 068 | 12/1993 |
| EP | 0 601 469 | 6/1994 |
| EP | 0 767 114 | 4/1997 |
| EP | 0 787 665 | 8/1997 |
| JP | 07 232811 | 9/1995 |
| JP | 08 200452 | 8/1996 |

OTHER PUBLICATIONS

Prospectus of RUD Kettenfabrik Rieger & Dietz GmbH & Co./Beumer, "Central Chain for Heavy–Duty Bucket Conveyors Systems", Apr. 1994.

German Industrial Standard Numbers (DIN), 15 231, 15 232, 15 233, 15 234, 15 235, 8150, 8152, 8156, 8157, 8164, 8154, 8165, 8167, 8175, 8176, 8168, 8187–1, 8187–2, 8187–3, 8188–1, 188–2, 8188–3.

"Rex Elevator and Drag Chains", Cement Industry Chains and Accessories of the Rexnod Corporation, USA 5/96, Bulletin No. 5014. (enclosed).

* cited by examiner

*Primary Examiner*—Douglas Hess
(74) *Attorney, Agent, or Firm*—Collard & Roe, P.C.

(57) ABSTRACT

A flexible chain for a single-strand bucket-type chain conveyor has inner link plates arranged in parallel pairs. The inner link plates are connected by two chain bolts, forming an inner chain link. The bolts extend through the two inner link plates and two outer link plates. The outer link plates connect adjacently mounted inner link plates, and create a platform for supporting the conveyor bucket. The chain has outer cylindrical bushings, each of which pivotably supports a bolt end segment. The outer bushings are connected in a fixed manner with outer link plates. When assembled a space exists between the inner side of the bushing's end and the end surface of the respective bolt, forming a lubricant chamber. A seal is provided between the running surface of the bolt end segment and the intermediate bolt section adjoining the running surface that is coupled to the inner link plates.

17 Claims, 5 Drawing Sheets

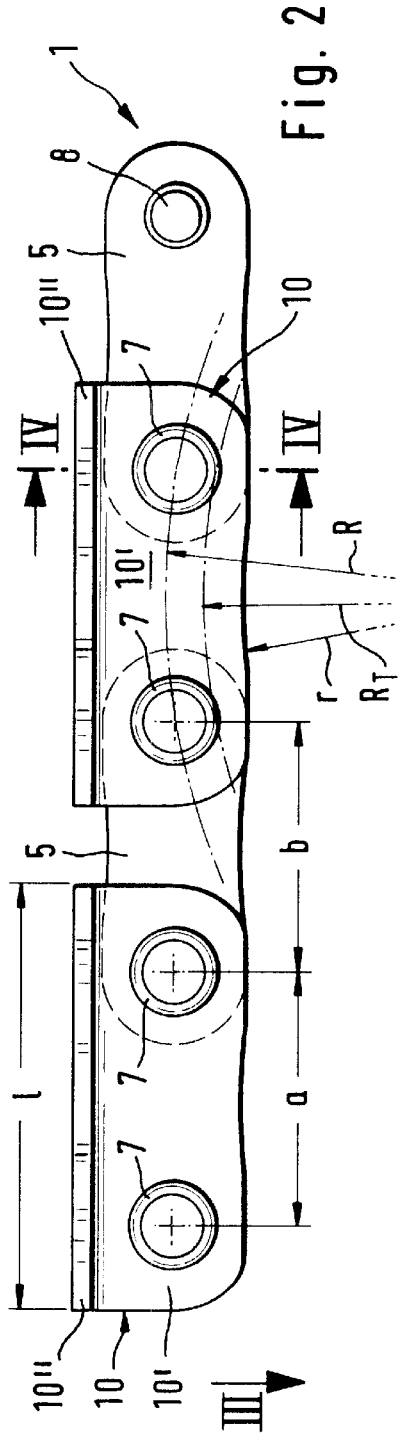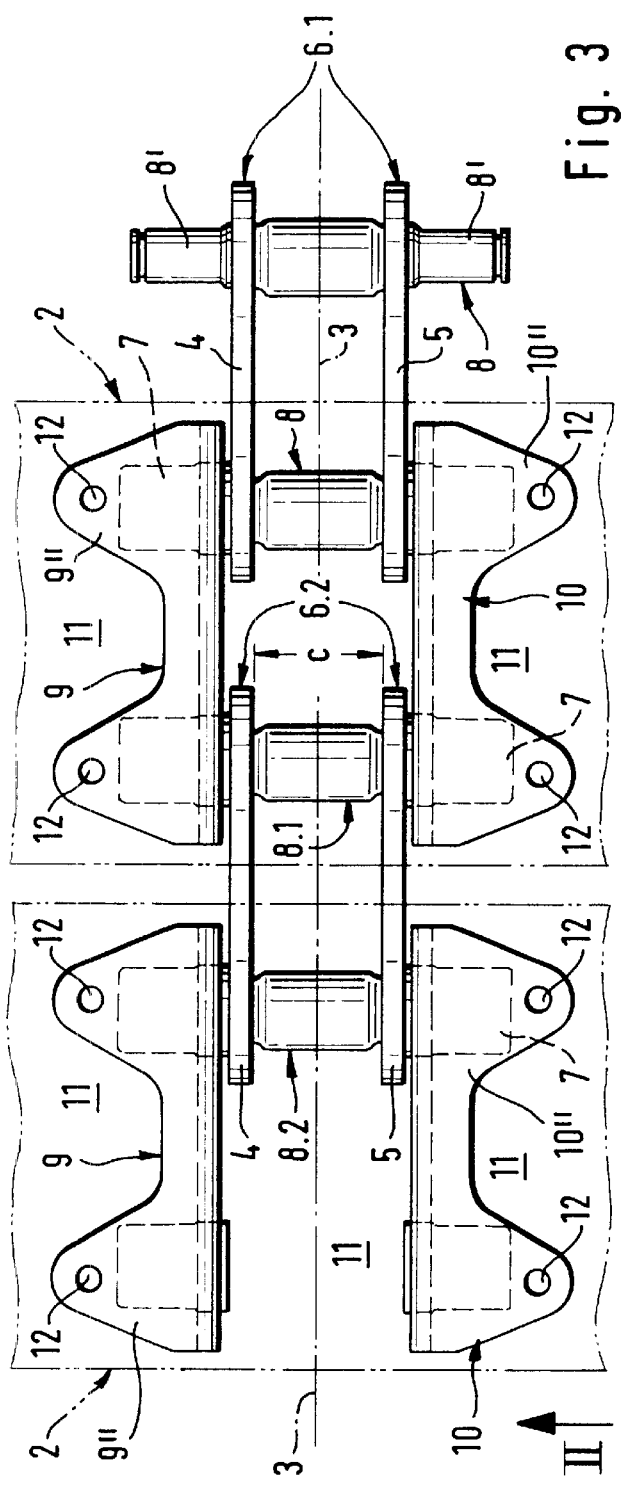

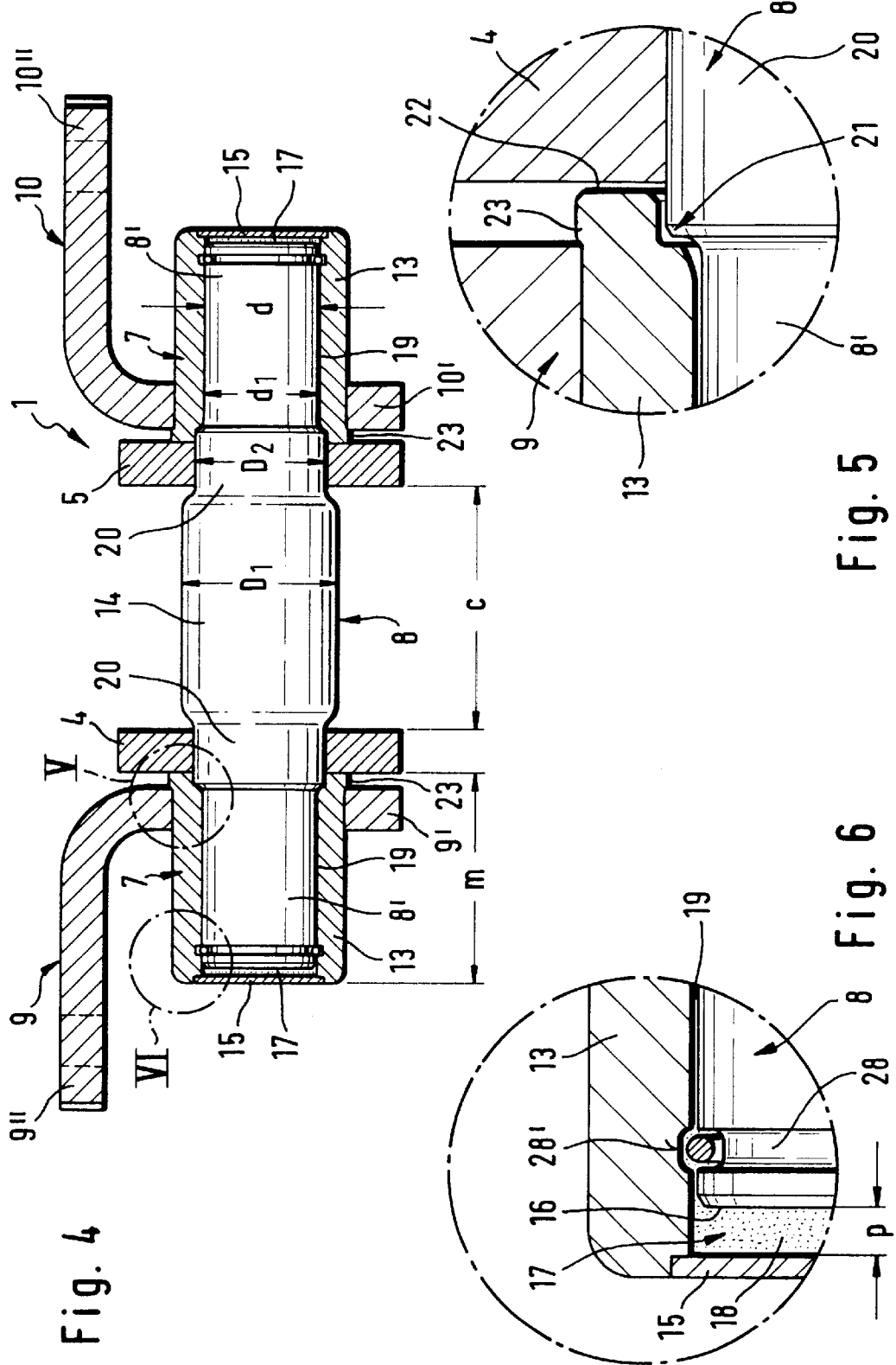

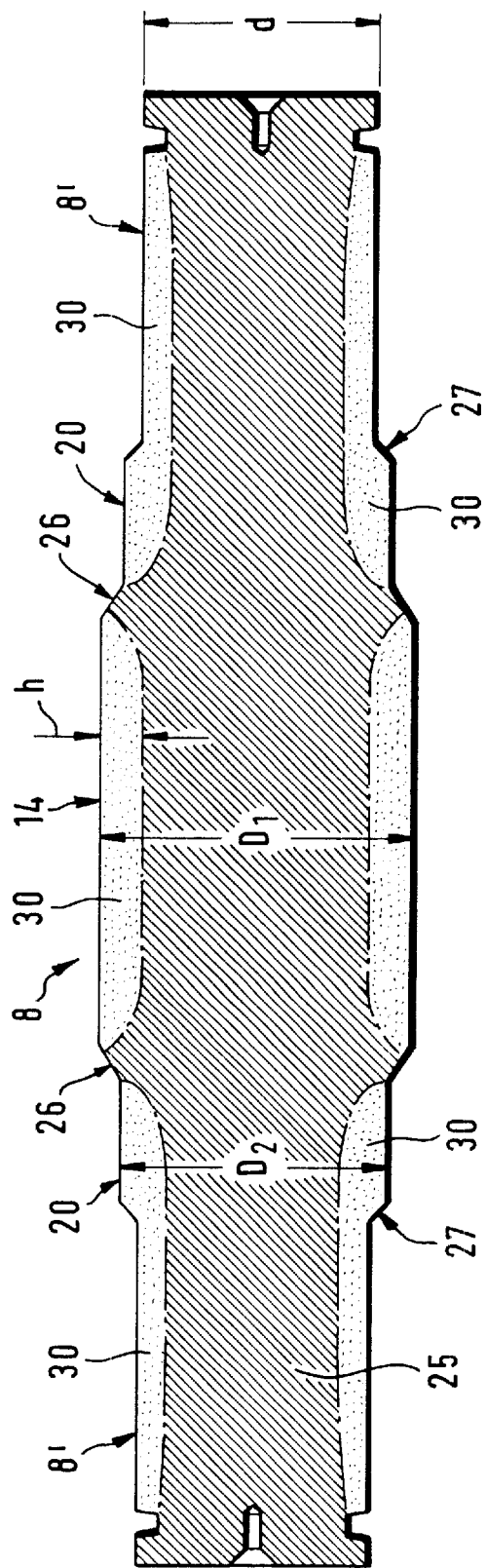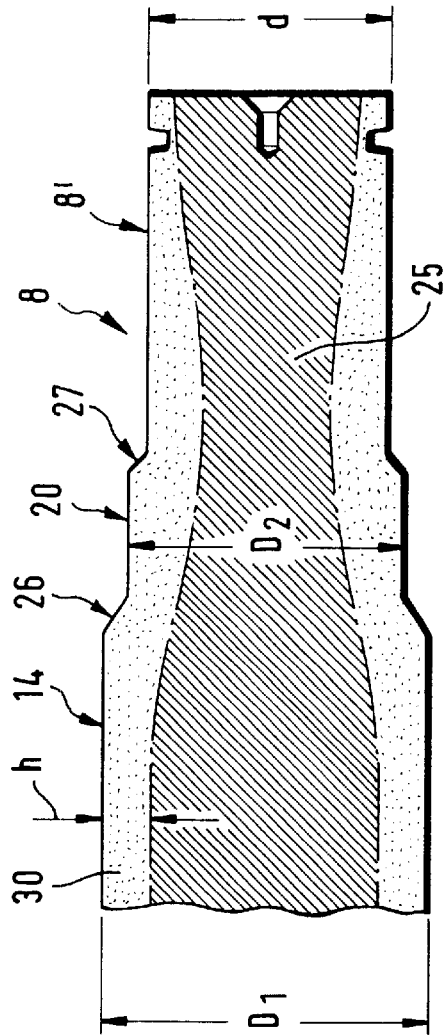
Fig. 7
Fig. 8

FLEXIBLE CHAIN FOR USE IN A CONVEYOR SYSTEM

BACKGROUND

The present invention relates to a flexible chain serving as the conveyor chain for a cell-type or bucket conveyor system. The endless conveyor strand having the chain supports a multitude of conveyor buckets successively secured in a row, one after the other, and travels around at least two reversing chain wheels disposed at the ends of the conveyor line. One of the reversing wheels is a driven wheel, and the other wheel functions as a tensioning wheel. A chain bucket conveyor system, in particular, a single or double bucket system, has a central chain arranged in the center in relation to the buckets. It has a multitude of inside flat-iron link plates that are arranged in pairs, parallel with each other, with a mutual crosswise spacing that are disposed parallel and symmetrically relative to the longitudinal axis of the chain. The flat iron inside link plates are connected to each other by two chain bolts extending at a right angle in relation to the longitudinal axis of the chain in one plane, forming an inside chain link in the area of their end sections. Each bolt extends through the two inside link plates of a pair of inside link plates associated with them, as well as through two outer link plates with a substantially L-shaped cross section. Each end of the outer link plate flexibly connects to two inner chain links disposed adjacent to each other, in the longitudinal direction of the chain. The outer link plates form fastening angles for securing the chain on a back wall of the conveyor buckets, or on a holding plate that may replace this back wall. The chain has to be connected by fastening means to the back wall of the conveyor buckets. One leg of each outer link plate extends parallel with the inner link plates, and is penetrated by two chain bolts of two inner chain links. The chain bolts are disposed adjacent to each other, and the two inner chain links are also disposed adjacent to one another. In the installed or assembled condition, the other fastening leg of the outer link extends parallel with the outside of a conveyor bucket back wall, and is then connected using a fastening means such as screws. If, however, only each nth (e.g. each second) potential conveyor bucket location is occupied by a conveyor bucket, it has to be connected with a holding plate or the like, so that each center bolt section of a chain bolt extending between the two inner link plates, and engaging the chain under high load as it runs up on the reversing wheels, has a greater diameter than the two end sections of the bolt disposed in the area of the outer link plate. This center enlargement of the diameter serves not only to reduce the area pressure applied to the highly stressed contact areas (and serves to increase the moment of resistance and thus the bending stiffness as well), but also forms ring-shaped stops of each bolt, against which the respective inner link plates can be placed from the outside during installation, so as to maintain their spaced apart position.

The term "cell conveyor" used above relates to a chain bucket system referred to also as an elevator system, and thus is one of the oldest continuous vertical bucket conveyor systems, or inclined bucket conveyor systems, or horizontal swinging bucket conveyor systems for the transport of bulk materials, whose conveying cells or carrying elements are designed as buckets for the bulk material to be conveyed. These buckets are usually made of steel and have a welded or deep-drawn type construction, or of gray cast or aluminum cast, plastic or rubber. They may have different shapes, depending on the type of bulk material to be transported, the shapes being flat, flat rounded, medium-deep, or deep with a plane or curved back wall (see, for example—DIN 15231-15235; 1541-15245; 2220-12223; 22211-22213). The vertical bucket system has the largest widening (see, e.g., VDI guidelines 2324 for "vertical bucket conveyor system"), which is indispensable, for example, as a continuously operating, vertical conveyor for transporting cement clinker in modern cement production plants.

Central chain-type bucket conveyor systems are designed as single-bucket systems, with a strand or line of buckets. However, they may also be designed as double-bucket conveyor systems. Here, two single-strand central chains, each having buckets, are disposed in a common bucket system housing. Each is jointly driven by only one drive by a driving wheel, mounted on a common shaft, whereas the tensioning wheels are generally mounted on separate shafts because the elongation of the two central chains may vary from one chain to the other, so that the tensioning distances that are independent of each other, are extremely useful for a double-bucket conveyor system.

Chains or belts (ropes, also in the past) are used as elements for pulling the bucket systems, whereby chains or ropes may be arranged in a single, or double strand. If a single strand is used as a central chain, it is arranged in the center, in relation to the bucket back wall. A two or double strand design, in a mirror-symmetrical arrangement relative to the center of the buckets, may be designed either on the bucket back wall, or on their side walls.

The pulling elements are made endless and are guided at the ends of the conveyor line. Thus at the head and foot of the bucket system are rollers, or wheels in the form of chain sprocket wheels, or profiled wheels or drums, and reversed at the head and foot. The bucket conveyor system is generally driven at the head, and the required pre-tensioning of the pulling element takes place at the foot. The reversing elements are generally referred to as reversing wheels, a driving wheel, or a tensioning wheel, regardless of what their fixed design is.

The bulk material to be transported is loaded in the buckets by loading or charging devices, such as feed chutes of swing conveyors or a loading bucket system. It can also be scooped up by the buckets at the foot of the bucket system from the so-called "sump" (scooping bucket system), preferably using scooping bucket systems for finely granular bulk materials because the scooping forces, and thus the strain acting on the pulling element and the buckets become very high if bulk material with coarser pieces is transported.

The buckets are emptied either by the force of gravity (slow runner) or by centrifugal force (fast runner), whereby the material is emptied from the buckets by the force of gravity.

Chain bucket conveyor systems have link or flexible chains serving as the pulling elements, whereby the link chains may be designed as chains with round links (round steel chains) or bridge-type chains, which, in conveying technology, are generally employed as hand or load chains on lifting equipment. The link chains, which are known in various designs of construction, are generally considered as being transmission chains, or load chains, as well as conveying chains for chain conveyors.

Bolt chains have the simplest and least costly type of construction of the jointed or flexible chains. As a rule, their link plates (or shackles) directly revolve on chain bolts that are secured (for example by rivets or splints) against displacement in the longitudinal direction.

Bolt chains include roller chains (see, for example DIN 8150) having a plurality of inner and outer link plates per link. Flyer chains (see, for example DIN 8152), as well as draw bank chains without bushings (DIN 8156), or with bushings can be used, (DIN 8157), wherein the flyer chains have a constant diameter throughout, and the diameter of the bolt of the other bolt chain types is generally smaller in the center area of the bolt extending between the inner link plates.

The present invention relates to a flexible chain for a chain bucket system, and in turn, to a single-strand bucket system with a central chain arranged in the center in relation to the buckets. Furthermore, it relates quite generally to cell conveyors even if the cell conveyors are not referred to as "bucket systems" in the narrower definition used in conveying technology. This is the case if the conveying line of a cell conveyor extends horizontally, and the conveyor cells, even if designed in the form of buckets, are secured and not swinging on the pulling element (as it is the case with a pendulum-type bucket system), but are connected with the pulling element in a fixed manner. When the term "bucket system" is used hereinafter, it always relates quite generally to a cell conveyor.

Bolt chains have been known in particular as roller chains from the time of Leonardo da Vinci, more than 500 years ago. They basically have inner and outer chain links, alternating with each other, and each consists of a pair of inner shackles, and a pair of outer shackles, in each case overlapping the two neighboring pairs of inside shackles, and flexibly connected with the latter in the two zones of overlap by a chain bolt extending in the longitudinal direction of the chain, similar to bicycle chains. A complete chain link, as defined above, consists of an inner chain link and an outer chain link.

Apart from the bolt chains, the flexible chains also comprise steel-bushed roller chains, as well as roller chains whose bolts all have a constant diameter as with the flyer chain.

As compared to the bolt chains, the steel-bushed roller chains basically exhibit high resistance to wear because their inner shackles are pressed onto inner bushings that are movably seated on the bolts that are connected with the bolts in a fixed manner, which reduces the area pressure. Steel-bushed roller chains (see, for example DIN 8154 and 8164) are generally designed and used for small pitches. These chains also include "conveying chains with solid bolts" both without rollers (DIN 8165; 8167; 8175; 8176) and also with rollers (DIN 8165; 8167; 8176), as well as "conveying chains with hollow bolts" with and without rollers (DIN 8168), and "conveying chains with fastening link plates" (DIN 8165; 8167; 8168).

Steel-bushed roller chains, with their wear resistant properties, have been recognized as being far superior to bolt-type chains even if they are employed as conveyor chains for chain bucket conveyor systems. They have been employed in the past (i.e. up through the 1970's and 1980's) as flexible chains, predominantly in slowly running bucket systems with gravity unloading of the buckets. They were also employed as link chains, designed as round links or round steel chains, used almost exclusively for high-speed systems with unloading of the buckets by centrifugal force. They also have been regularly employed, in the meantime, for high-speed bucket systems and the like.

In chain bucket systems with a central chain, fractures of the center bolt sections (between the inner shackles) have often occurred, in spite of suitable material selection and high manufacturing quality, even if the inner bushings were not, or only partially worn, because of their surface hardening. Surface hardening is used to minimize the wear, on both their outer jackets, which come into engagement with the reversing wheels, and their inner jackets that are engaged with a center segment of the chain bolt.

Attempts have been made to overcome these problems through the use of better and stronger materials. However, this measure did not remedy the situation in any decisive manner. On the contrary, the occurrence of fractures of the inner bushings frequently increased with the selection of high-quality materials.

To explain this surprising phenomenon concerning the extremely troublesome fractures of the inner bushings, it was found that the inner bushings of steel-bushed roller chains cannot withstand the pulses or shocks that occur when the chain runs up on the reversing wheel, especially when they are highly stressed, in relation to braking strength, in spite of the material selection and dimensioning of the chain. This is also in spite of their being adapted by their construction, to alleviate the shocks accordingly. The cause of the failures is assumed to do with a hardening depth of a few millimeters between the hardened areas on the outer jacket, and the inner jacket of the inner bushings. Hardly any tough-elastic (cylindrical) "core" is thus left over, so that the inner bushings are admittedly highly resistant to wear, both on the outside and the inside, yet brittle almost all the way through, and thus sensitive to shocks. Even though the inner bushings of steel-bushed roller chains are smooth, through-extending cylinders, and are free of notches per se, fine notch-like fissures are caused by rough operating conditions. The periodically occurring shock stresses cause numerous fine cracks leading to permanent failures on the hardened, brittle outer and inner areas of the inner bushings, or because only a small tough-elastic "core area", remains. However, each event of damage is particularly troublesome, especially for a bucket system employed in a cement production plant, since failures cause substantial production costs, apart from the actual repair costs, and can cause a complete plant shutdown, due to the repair work.

The roller chains (see, for example DIN 8187; 8188), because of their almost unlimited field of application, are generally viewed as the most important chains, even though they represent the most expensive design of the flexible steel chains. Their difference over the steel-bushed roller chains, consists in the reduction of the wear and noise of the hardened and generally ground (protective) rollers supported in the bushings. Their costly manufacture permits high capacities, for example in excess of 1,000 kW for driving chains, as well as high chain speeds of up to 30 meters/s. However, their high cost manufacture and structure often makes them unsuitable (apart from their costs) for rough operating conditions frequently found in the field of conveying technology. Their sliding surfaces, which are produced at great expense, cannot be adequately protected against the penetration of bulk material dust or other contaminants, so that their useful life is shortened due to the high wear. Therefore, they are not economically acceptable.

Because the outer shackles of flexible chains overlap the inside shackles associated with them in the end sections, and are generally close to the outer sides of the inner shackles disposed adjacent to them. Because the chain bolts generally extend largely free of play, and with a relatively close fit through the correspondingly shaped drilled holes or bores provided for passing the shackles there-through, flexible chains have only limited transverse mobility, compared to link chains that can move on all sides. Even though flexible chains are not subjected to any substantial pull when slanted in the transverse direction, they have a good center guidance against migrating sideways. This is a highly desirable design especially for a chain bucket system with a central chain, because the chain is generally guided in a form-locked manner, only on the reversing pulleys, mounted at the ends of the conveyor line.

At least one of the reversing wheels of a bucket chain conveyor system is a chain sprocket wheel. This wheel does not have to be the driving wheel for introducing driving force into the chain or chains acting as the pulling element or elements, even though the driving force is high for a large cell-type conveyor.

Although belt bucket conveyor systems for higher levels of conveyance and streams of conveyed material continue to be very important, quantitatively speaking, because they operate with less noise and more quietly as compared to bucket chain conveyor systems, they are usually not usable for certain individual applications for transporting hot materials (see, for example, "Zement, Kalk, Gips" [Cement, Lime, Gypsum], 1974, edition e, pages 176 to 181). Thus, the chain-driven cell conveyors such as a bucket chain conveyor system continues to be of substantial importance. Thus also applies to the chain serving as the pulling element as well as the means for carrying the conveyor cells.

Flexible chains for cell conveyors such as bucket systems have been continuously designed as steel-bushed roller chains (see, for example, DE 35 03 302 CCC2; DE 42 33 550 C2; EP 0 662 924 B, or. for example, the prospectus of RUD Kettenfabrik Rieger & Dietz GmbH & Co./Beumer "Central Chain for Heavy-duty Bucket Conveyors Systems" dated April 1994), whereby separate fastening angles arranged outside of the outer shackles on the end segments of the bolts are generally associated with each of the chain links. The conveyor cells have to be secured on the chain by means of the fastening angles.

However, steel-bushed conveyor chains where the outer shackles of the chain have an L-shaped cross section, and also serve as the fastening angles are known (see, for example, Bulletin No. 5014, "Rex Elevator and Drag Chains"—Cement Industry Chains and Accessories of the Rexnod Corporation, USA May 1996).

However, the fractures of the inner bushings described above still occur with these steel-bushed roller chains. A test wherein steel-bushed chains were replaced by bolt chains did not lead to any satisfactory results, so that the trade world has reluctantly stayed with steel-bushed roller chains, and has thus accepted the drawbacks and costs of these systems.

SUMMARY OF THE INVENTION

The present invention provides an improved flexible or jointed conveyor chain for use in very rough operating conditions for bucket systems, having the benefits of a bolt chain versus a steel-bushed roller or roller chain, with a very simple and inexpensive type of construction, and having a substantially increased resistance to wear, with a long useful life over conventional bolt chains. It is substantially more reliable to operate than a bushed roller chain, and has low maintenance. Moreover, the chain can be turned over to prolong its useful life, and is easy to install and dismantle without the need for special tools.

The flexible conveyor chain of the invention provides a hybrid or intermediate design between a classical bolt chain and a bushed roller chain, because no inner bushings, surrounding the center bolt segment are present, a feature typically found in a steel-bushed roller chain. The bolt moreover, is not supported in the shackles as with a conventional bolt chain, as in cylindrical bearing cups pressed into the drilled holes in the shackles, but has pot-shaped outer bushings that are connected in a fixed manner with the outer shackles, as known from bushed chains, if use is made of "floating" bolts. These bolts are freely rotating with a limited axial mobility in a complete encapsulation of the bushing formed by two outer bushings, and an inner bushing aligned with the outer bushings. The flexible chain of the invention could be called an "outer bushing-type bolt chain" having many advantages that would be obvious to experts in the field. The structure of the chain is almost as simple, and cost favorable as conventional bolt chains, and substantially simpler and more cost effective than conventional bushed chains. Moreover, the weight per meter is distinctly lower for the same breaking load (e.g. at a breaking load of 1,200 kN, clearly lower than 80 kg/m), and practically no maintenance is required because of the self-lubrication of the encapsulated bearing surfaces. The relatively high wear of conventional bolt chains (as compare to bushed chains) has been substantially reduced by the design of invention. Moreover, no permanent fractures have been experienced in spite of the increased diameter of the bolts, which, is unusual in connection with bolt chains.

Here, the bolts are surface-hardened not only on their outer sides, or in the areas adjacent to the inner sides. The chain bolts are also provided with a very tough-elastic core, especially in the highly stressed contact zones, and also provided with zones where the depth of the hardness varies, and there is no hardness in core areas. Thus, permanent fractures can be avoided with high reliability, in spite of the fact that single segments of the bolts have different diameters.

By employing bolts whose diameter is smaller in the bolt end segments than in the neighboring segments of the bolts disposed closer to the center, a labyrinth seal can be disposed between the segment of a bolt located in the area of an inner shackle, and the final segment of the bolt adjoining the former segment outwardly. Thus, the conveyed material or dust or other contaminants cannot penetrate the area, or such penetration is at least made more difficult, in order to increase the resistance to wear, and thus prolong its useful life. The pot-shaped outer bushings preferably extend, slightly beyond the respective end segment of the bolt, and the inner end of the segments have a greater inside diameter, corresponding with the diameter of the bolt in the segments. Each of the outer bushings are designed so that their inner, annular surfaces are close to the outer side of the respective inner link plate, forming a narrow gap, or are directly adjacent to or resting against the outer surface of the inner plate.

The outer bushings are preferably pot-like or cylindrically shaped, and can be manufactured from low cost tubular semi-finished products. They can be sealed on their free, distal outer ends by covers, pressed or screwed into the ends so as to prevent conveyed material or contaminating substances from penetrating the outer bushings. Moreover, the outer bushings or bearing surfaces of the end segments of the bolts disposed in the bushings are self-lubricated from the ends of the bolts. In order to accomplish this, the inner side of the bottom of a pot-shaped outer bushing or its cover is spaced from the end surface of the respective bolt to form a lubricating chamber that can be filled with a lubricant, such as grease.

A simple installation or dismantling of the system, is possible without requiring any special tools, since the bearing bushings are provided on the inner end segments of their outer jacket surfaces with a slightly larger outside diameter than in the remaining segments, whose outer diameters are equal to the diameters of the bores of the outer shackles formed by the fastening angles. The bolts are provided with a groove extending around their two end segments with a small spacing from their respective faces. A locking ring having radial elasticity, is disposed in each of the grooves, and the outer bushings are provided on their inner jackets with a corresponding groove, that is engaged by the locking ring during the installation, as to provide a simple, detachable assembly.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only, and not as a definition of the limits of the invention.

In the drawings, wherein similar reference characters denote similar elements throughout the several views:

FIG. 2 is an enlarged side view partly in cross-section of the chain segment of FIG. 1 taken along arrow II of FIGS. 1 and 3;

FIG. 3 is a top view of the chain segment according to FIGS. 1 and 2 on the same scale as FIG. 2, taken along arrow III of FIG. 2;

FIG. 4 is a cross-sectional view of the chain segment taken along line IV—IV of FIG. 2;

FIG. 5 is an enlarged view of the dash-dotted circle V of FIG. 4;

FIG. 6 is an enlarged view of the dash-dotted circle VI of FIG. 4;

FIG. 7 is a top view of an enlarged central section through a chain bolt versus the representation in FIGS. 1 to 4;

FIG. 8 is a representation of a variation of the bolt according to FIG. 7; and

DETAILED DESCRIPTION

Figure 1:
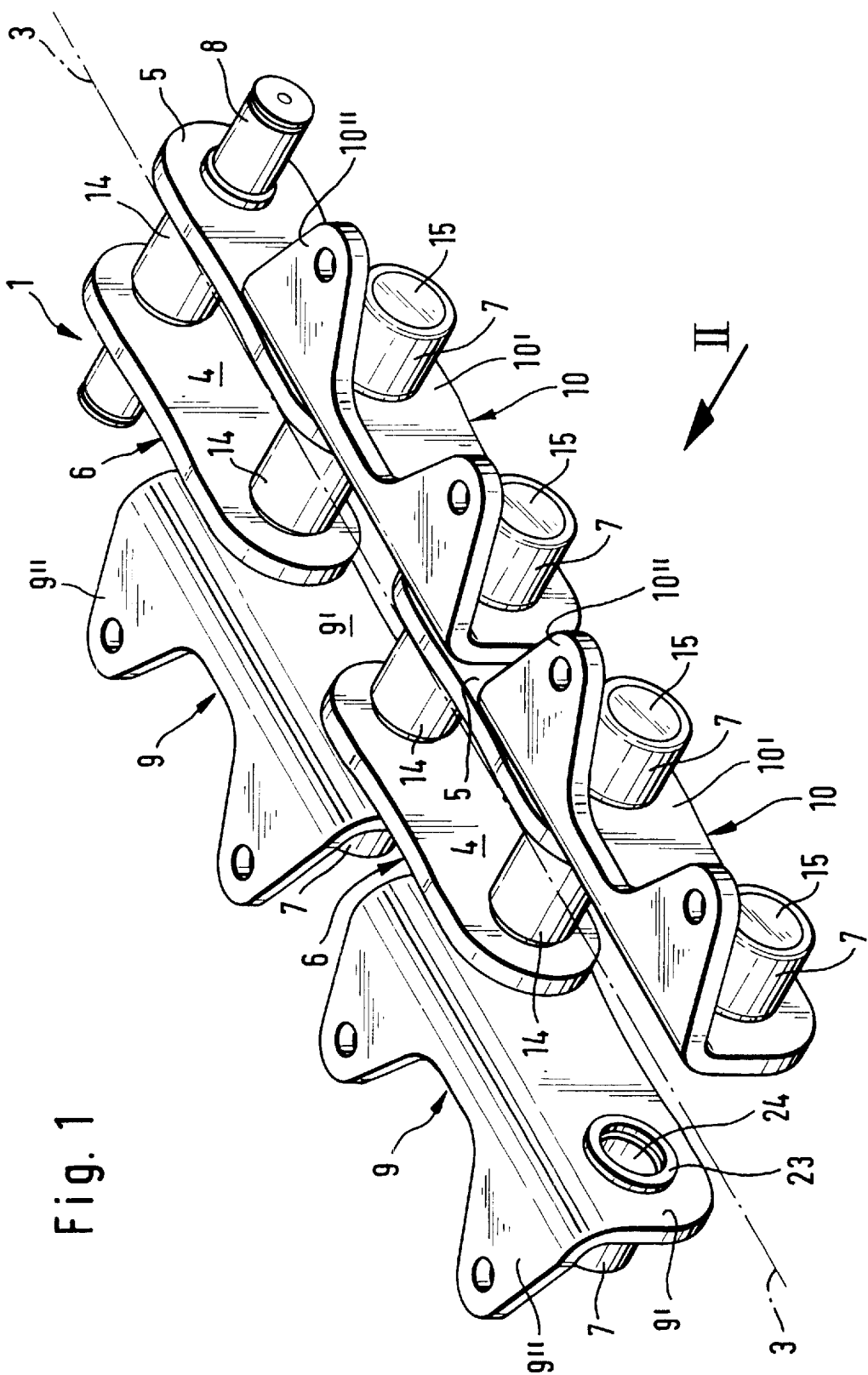
FIG. 1 is a perspective view of a short segment of the flexible chain as defined by the invention.

FIGS. 1 to 4 show a short section of a flexible (or jointed) chain 1 for use with a cell conveyor, not substantially shown in greater detail. The endless conveyor strand of the cell conveyor is comprised of the chain 1 and a multitude of the conveying cells 2, shown in dotted line in FIG. 3, which are successively secured in the chain, row after row. The conveyor strand revolves around two reversing wheels (not shown) mounted at the ends of the conveyor line. The reversing wheel that is mounted at the foot of the conveyor line, is designed as a toothed chain sprocket wheel, which by means of a suitable tensioning device, applies tension to chain 1 in its longitudinal direction. The other reversing wheel or driving wheel, mounted at the head of the conveyor line, is the driven wheel, which, also drives chain 1 in addition to its reversing function. This driving wheel is not toothed, but has a conventional profiled jacket surface whose periphery is slightly larger in the center zone of the jacket than in the two edge zones, and adapted to fit the configuration of the chain, in order to frictionally grip chain 1. The required driving moment has to transmitted by this frictional grip from the drive to the chain via the driving wheel, as disclosed in the RUD/Beumer prospectus "Central Chain for Heavy-duty Bucket Conveyor Systems" cited above.

The embodiment shown in the drawings relates to a jointed chain for a single-strand bucket conveyor system in which conveyor cells 2 consist of buckets.

Flexible chain 1 has a multitude of flat-iron link plates 4 and 5, which are arranged in pairs, parallel with each other, and parallel with the longitudinal axis 3 of the chain, with a mutual cross spacing "c". Forming an inner chain link 6 on their end segments, the spaced apart pairs of flat-iron link plates 4 and 5 each connect the two bolts 8, supported in the outer bearing bushings 7 extending in one plane, at right angles in relation to longitudinal axis 3 of the chain. The bolts each extend through apertures in the two inner link plates 4 and 5, as well as through corresponding apertures in two outer link plates 9 and 10, which each flexibly connect the two inner link plates 4, 4 of the two neighboring chain links 6 and 6. The inner link plates 4, 4 are disposed adjacent to each other in the longitudinal direction 3 of the chain.

Chain 1 is connected, in a fixed manner, with each bucket 2 by means of two substantially L-shaped fastening angles, which are formed by the outer link plates 9 and 10 of chain 1. The one leg 9' or 10' of the outer link plates 9 or 10, respectively (=the fastening angle) extends parallel with inner link plates 4 and 5, and with longitudinal axis 3 of the chain, and is penetrated by the two neighboring bolts 8.1, 8.2 of the two neighboring chain link 6.1, 6.2. In the mounted condition (see FIGS. 1 to 4), the other fastening leg 9" or 10", respectively, extends parallel with the outer side of the bucket back wall 11, and is secured on the back wall by means of screw connections not shown. The screws of the screw connections extend through the through-extending drilled holes (or bores) 12. Two of such bores is provided in each fastening leg 9" and 10".

The outer link plates 7 for bolts 8 each consist of only the two substantially tubular material sections 13 serving as outer "flexible bushings", each associated with a bolt end segment 8'. The clear inside diameter "d" is only slightly larger than the outside diameter "d" of the bolt end segments 8', whereby the length "m" of the bushing 7 and thus of the outer bushings 8, is about equal to the length of the bolt segment 8' projecting outwards beyond the outer side of the respective inner link plate 4 and 5, respectively, (plus the thickness of the inner link plate and a minor addition amount). In any case, the length is only as great as the center section 14 of a chain bolt 8 disposed between the two inner link plates 4 and 5, associated with each other, not covered by an inner bushing.

As shown in FIG. 4, each bushing forms an outer bushing 7 for a bolt end segment 8', and slightly extend inwardly beyond the inner side of legs 9' and 10', respectively, of outer link plates 9 and 10, respectively. Bushings 7 are press fit in a fixed manner to legs 9' and 10' of the outer link plates 9 and 10, respectively, forming a fastening angle.

In order to prevent conveyed material, or dust of such material, or other contaminating materials from penetrating the bearing sites from the outside, the outer bushings 7 are provided with a pot-like shape. They are sealed at their outer ends notably by pressing or screwing a cover 15 into a corresponding recess located at the free outer end of bushing 7, as shown in FIGS. 1, 4, 6, and 9.

The inner side of cover 15 of pot-shaped outer bushings 7 defines a spacing "p" from the respective end surface 16 of bolt 8, so as to form a grease chamber 17, which is filled with a suitable lubricant 18 when the system is assembled.

In the course of operation of the system, when the lubricant is heated, it can gradually penetrate gap 19 located between the sliding surfaces of the respective bolt end segment 8' and the associated outer bushing 7. This dispenses with the usual maintenance requirement.

In order to prevent dust thereof, or other contaminating substances from penetrating bearing gap 19 from the outside, or to at least reduce such penetration to a harmless measure, and to keep the wear of the bolts and bushings on the bearing surfaces extremely low so as to prolong their useful life, a labyrinth seal 21 as shown in FIG. 5, is formed between a section 20 of bolt 8, located in the area of inner link plate 4 or 5, and the end segment 8' of bolt 8 adjoining outward portion of the section. Each bolt 8, on its end segment 8', has a diameter "d" that is smaller than on the adjacent intermediate bolt segment 20. The distal end of bushing 7 of outer bushing 7 extends beyond the bolt end segment 8', and has a correspondingly larger diameter on its internal end segment. The proximal end of bushing 7 of the outer bushing 7, with its end, annular surface 22, is located very closely adjacent to the outer side of the respective inner link plate 4 or 5, forming in this way, a very narrow gap.

As shown in detail in FIG. 5, as well as in FIGS. 1, 2 and 4, outer bushings 7 each have on their end segments of their outer jacket surface, a slightly larger outer diameter than in the remaining segments. The outside diameters are equal to the diameters of the bores in the respective outer link plates 9 and 10. A ring-shaped or annular projection 23 is formed in this way. When the system is assembled, projection 23 forms a stop means when the bushing 7 of an outer bushing 7 is pressed into a through-extending bore 24 from the inside. The enlarged diameter of annular projection 23 prevents bushing 7 from becoming disengaged from link plates 9 or 10.

Apart from convention chain bolts of shackled chains, which are designed as steel-bushed roller chains, bolts 8 of flexible chain 1 as defined by the invention has bolts 8 that have diameters that are stepped a number of times. Diameter $D_1$, is the largest in the center section 14, which, during the course of operation, runs up on the reversing wheels without being covered by an inner bushing. With a chain with a mathematical breaking force of 1,200 kN, the diameter may amount to, for example 55 mm, whereas the diameter $D_2$ may amount to, for example 46 mm in the area of the intermediate bolt section 20 adjoining the center segment. The diameter "d" in the area of the bolt end segments 8' may amount to, for example 40 mm with a total length of the bolt of about 270 mm and a length of the outer bushing of 75 mm.

In order for the substantial forces, occurring in the course of the operation, and also in the highly stressed contact zones to be reliably absorbed, or in order to achieve as little wear as possible, bolts 8 are hardened only in sections on their outer sides, and in the highly stressed contact zones, have a tough-elastic core 25 with a large diameter.

In the bolts according to FIG. 7, the depth "h" of the hardness varies over the length of the bolt. In the embodiment shown, it amounts to 6 mm at the most. In FIG. 7, the hardened zones are shown brighter vis-à-vis than the gray tough-elastic core 25, and denoted by dash-dotted lines. The notched portions 26 are disposed in the area where the diameter changes are not surface-hardened in order to reduce these areas from the hazard of permanent fractures. It is also possible to dispense with hardening, in the notched areas 27 between the bolt end segments 8' and the intermediate bolt segments 20 adjacent to the end segments, if recommended because of the selected material and under the given operating conditions.

FIG. 8 shows another embodiment of bolt 8 that is substantially hardened over its entire length along its periphery, or in its jacket, to about the same depth throughout. It has been found in tests for testing the permanent stress out, that this through-extending hardness is, as a rule, surprisingly more favorable, depending upon the material used than having an interruption in the hardness in areas where the diameter changes.

Figure 9:
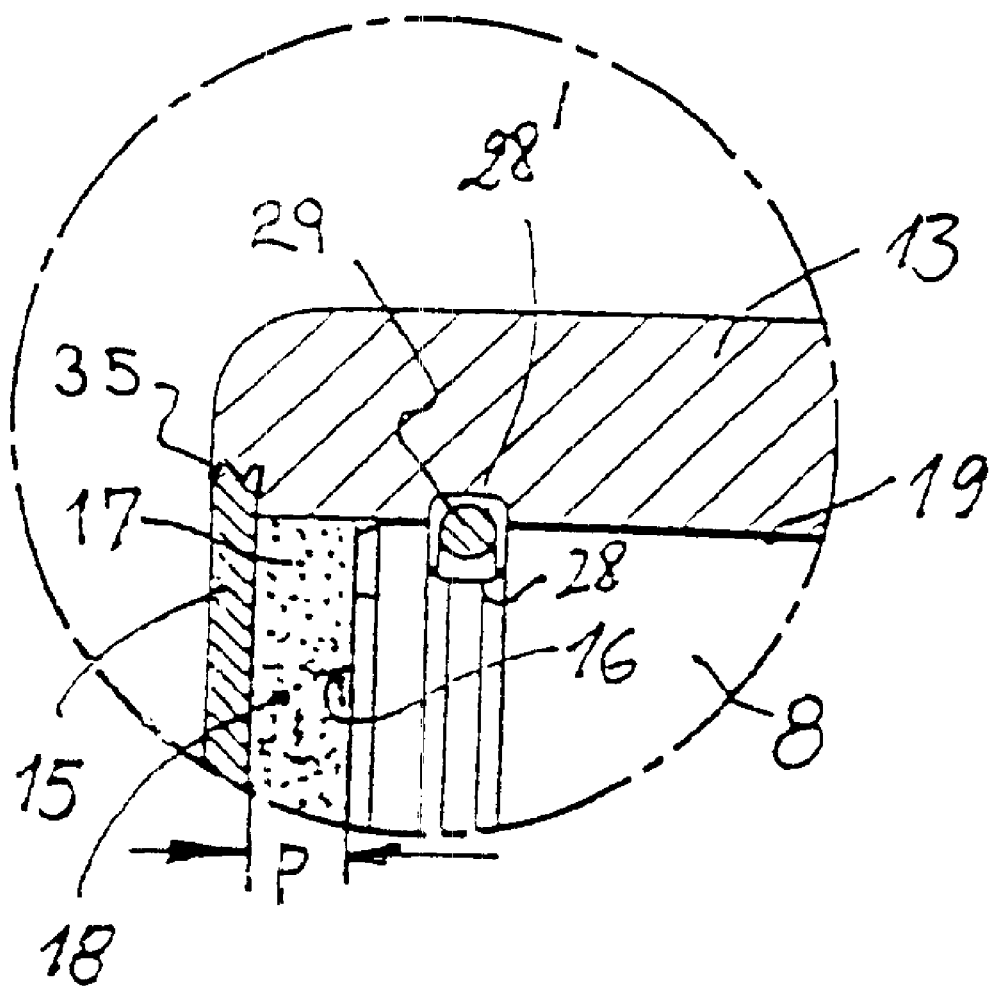
FIG. 9 shows the embodiment of FIG. 6 with a threaded cap.

FIG. 9 shows the embodiment of FIG. 6, wherein cap 15 is threaded into the end of bushing 13, instead of being press fitted.

Chain 1 of the invention can be easily installed or dismantled in a simple way. Since outer bushings 7 extending from outer link plates 9, 10 outwardly, are press fitted together with outer link plates 9 and, respectively 10 in a fixed manner, inner chain links 6 with two inside link plates 4 and 5, and two bolts 8, 8 can be plugged together by sections with an outer chain link consisting of outer link plates 9 and 10, and the two outer bushings 7, 7) and then installed. Thus, the parts of chain 1 are secured before the conveyor cells or buckets are installed.

Since inner link plates 4 and 5 are designed in the form of flat-iron link plates or "flat-steel link plates", it is possible to provide a fine graduation of different types of chain sizes with varying load values between 800 and 2,000 kN, while still adhering to the design principle of the invention. Moreover, in order to optimize or maximize the wear potential between the reversing wheels and chain 1, the principle of the so-called "three-point bearing" has been realized with the link plate chain 1 of the invention. During the initial running-in stage, a reversing wheel is to make contact first with the center bolt area 1. If, after a certain operating time, a certain wear, such as, for example, 0.2 mm has occurred between the contact partners, the inner link plates 4 and 5 are to come into contact with the corresponding areas of the contact zones having the smaller diameter. Thus, inner link plates 4 and 5 are already recessed, as shown in FIG. 2, with a radius $R_T$. In the present embodiment using 472.5 mm, the partial radius "R" becomes 500 mm, and the foot radius "r" is 445 mm.

Finally, it is pointed out that the link plate chain 1 is designed so that it can also be used with outer link plates 9 and 10, which, at the same time, form the fastening angles, turned over. So that flexible chain 1 can be pre-installed by sections, and to be able to plug these sections together, bolts 8 are provided on their two end segments 8' with an annular groove 28 extending all around with a small spacing from the respective end surface, and fitted with an elastic locking ring 29 disposed in each of the grooves. Bearing bushings 7 are provided on their inner jackets with a corresponding groove 28', which is engaged by the locking ring 29 when the chain is assembled. The cross-sectional diameter of locking ring 29 is made sufficiently large so as to engage into both mating grooves 28 and 28' and thus prevent bolts 8 from becoming disengaged from bearing 7.

Flexible chain 1 of the invention with its design improvements is superior to the known jointed chains in many ways, and requires practically no maintenance. Furthermore, due to the chain's extremely simple and strong structure, its simplified manufacturing, mounting, and dismantling methods over the prior art, and its low meter weight of distinctly below 80 kg, with a mathematical breaking load of, for example 1,200 kN, it is economically superior as well. Moreover, the chain's low maintenance requirements, which are substantially limited to only safety inspections, and its low wear and thus long useful life provide a reduced risk of failure of the inner bushings, a common hazard of bushed chains.

In order to accommodate the pitch of one or more sprocket wheels, the longitudinal spacing between the inner link bolts a, and the spacing between adjacent inner links b has to be equal, and set to accommodate the pitch of the sprocket wheel.

Accordingly, while two embodiments of the present invention have been shown and described, it is to be understood that many changes and modifications may be made thereunto without departing from the spirit and scope of the invention as defined in the appended claims.

What is claimed is:

1. A flexible chain for use as a conveyor chain in a conveying strand along a longitudinal axis with a multitude of successively secured conveyor buckets, wherein the conveying strand revolves around two reversing wheels mounted at the ends of the conveyor line, and one wheel is driven while the other functions as a tensioning wheel for supporting a single or double bucket system with at least one central chain, wherein each flexible chain comprises;

a plurality of pairs of inner link plates spaced apart and disposed parallel with each other along the longitudinal axis of the chain, wherein each link plate has a pair of spaced apart apertures;

a plurality of chain bolts, each having a center section, and an end segment, integrally formed on each side of said center section, and an intermediate section each integrally formed between said center section and said end segments, and extending perpendicular to the longitudinal axis of the chain and, wherein the end segments of said pairs of said chain bolts connect and extend through the apertures of said pair of inner link plates to form an inner chain link and wherein said center section of said bolt is disposed in the space between said link plates and has a larger diameter than both said end segments and the aperture of said inner link plates;

a plurality of tubular outer bushings each pivotably coupled to each end segment of each chain bolt, and having a lubricant chamber disposed between a distal end of said bushing and the end surface of the end segment of said chain bolt, and wherein a seal is provided between a running surface of said bolt end segment and said intermediate bolt section adjoining said running surface that is coupled to said inner link plates;

a plurality of spaced apart pairs of outer link plates, wherein each outer link plate has an L-shaped cross-section with a first leg having a pair of spaced apart apertures coupled to adjacent bushings so as to pivotably join to adjacent inner chain links, and wherein a second leg of said outer link plate extends away from said inner link for connection in a fixed manner to a back wall of a conveyor bucket; and wherein each end section of said chain bolts extend through said inner link plates of said inner links and one leg of said outer link plates and into said outer bushings to form a complete flexible chain.

2. The flexible chain according to claim 1, wherein each of said bushings, has a cover disposed on its distal outer end to cover said lubricant chamber.

3. The flexible chain according to claim 2, wherein said cover is press fitted into the end of said bushing.

4. The flexible chain according to claim 2, wherein said cover is screwed into the end of said bushing.

5. The flexible chain according to claim 1, wherein said tubular outer bushings each are press fitted into the apertures of an adjacent and corresponding outer link plate, respectively.

6. The flexible chain according to claim 1, wherein said intermediate section of each said bolt is integrally formed between its enlarged center section and its two end segments, with the diameter of said intermediate section being smaller than the diameter in its center section and larger than the diameter of each of its end sections.

7. The flexible chain according to claim 6, wherein said seal is formed between the running surface of each bolt section and said bolt section adjoining said end section and comprises a labyrinth seal.

8. The flexible chain according to claim 7, wherein said labyrinth seal, formed between said bolt end segment and said bolt intermediate section, includes said tubular bushing protruding beyond the respective bolt end segment, and in its open end segment disposed on the inside, and has an inside diameter corresponding with the diameter of the intermediate sections of said bolts, and the inner end of said bushing, with its ring-shaped end surface, rests against the outer side surface of the respective inner link plate, respectively, or is arranged closely adjacent to said outer surface.

9. The flexible chain according to claim 1, wherein said outer bushings each have a slightly larger outside diameter in the inner end sections of their outer jacket surface than in their remaining section, and wherein the outside diameter of said inner end section is equal to the diameter of the aperture of the respective outer link plates, respectively.

10. The flexible chain according to claim 9, wherein each of said two end segments of said bolts comprise;

an annular groove extending all around, and spaced apart and adjacent to the end surface of said bolt, wherein the inner surface of the distal end of said outer bushings each are provided with a corresponding groove; and a radially elastic locking ring disposed in each of said grooves to lock said bolts to said outer bushings.

11. The flexible chain according to claim 1, wherein said bolts are surface-hardened substantially over the entire length of their outer peripheral surface.

12. The flexible chain according to claim 11, wherein the peripheral surface of said bolts have hardened zones with a varying hardening depth, and the core of said bolt comprises a tough-elastic metal.

13. The flexible chain according to claim 12, wherein said bolts are hardened to a lesser depth in the transitional areas that have a substantial change in the diameter.

14. The flexible chain according to claim 11, wherein said bolt has a diameter of about 35 to 70 mm, and wherein the surface hardening depth is between 4 to 7 mm.

15. The flexible chain according to claim 1, wherein the chain can initially be assembled or dismantled without conveyor buckets, from pre-mountable chain sections each comprised of at least one inner chain link, and an outer link plate, respectively, wherein said two outer bushings are press fitted to said outer link plate.

16. The flexible chain according to claim 1, wherein said inner link plates, with their side facing the driving wheel, are recessed with a radius conforming to the radius of the driving wheel.

17. The use of a flexible chain according to claim 1, as a conveyor chain or chains for a well conveyor, in particular, for a single or double bucket conveyor system with a central chain or chains.

* * * * *